United States Patent [19]
Ford et al.

[11] Patent Number: 5,401,368
[45] Date of Patent: Mar. 28, 1995

[54] FLUID-COOLED HOLLOW COPPER ELECTRODES AND THEIR USE IN CORONA OR OZONE APPLICATIONS

[75] Inventors: Keith G. Ford; Peter K. Stephenson; Russell B. Hatch, all of Swindon, United Kingdom

[73] Assignee: Praxair S.T. Technology, Inc., Danbury, Conn.

[21] Appl. No.: 51,430

[22] Filed: Apr. 23, 1993

[51] Int. Cl.⁶ ............................................. H05B 7/00
[52] U.S. Cl. .................................. 204/164; 204/242; 204/280; 204/290 R; 204/292
[58] Field of Search .................. 204/290 R, 292, 280, 204/164, 242

[56] References Cited

U.S. PATENT DOCUMENTS

| | | | |
|---|---|---|---|
| 4,145,386 | 3/1979 | Rosenthal | 264/22 |
| 4,291,226 | 9/1981 | Rueggeberg | 250/324 |
| 4,334,144 | 6/1982 | Ferrarici et al. | 219/383 |
| 4,774,062 | 9/1988 | Heinemann | 422/186.19 |
| 4,841,409 | 6/1989 | Kalwar et al. | 361/230 |
| 4,908,165 | 3/1990 | Kramer et al. | 264/22 |

*Primary Examiner*—John Niebling
*Assistant Examiner*—Arun S. Phasge
*Attorney, Agent, or Firm*—Cornelius F. O'Brien

[57] ABSTRACT

A hollow elongated copper corona electrode that contains a dielectric coating and is cooled by a fluid, such as a water-base liquid, being fed through the electrode and a process for using such an electrode in a corona apparatus or in an ozone generator.

17 Claims, 2 Drawing Sheets

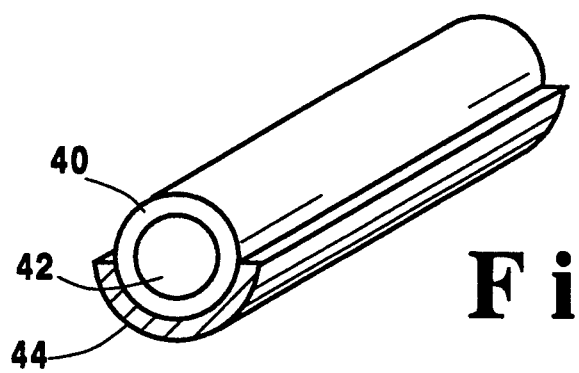
Fig. 3A

Fig. 4
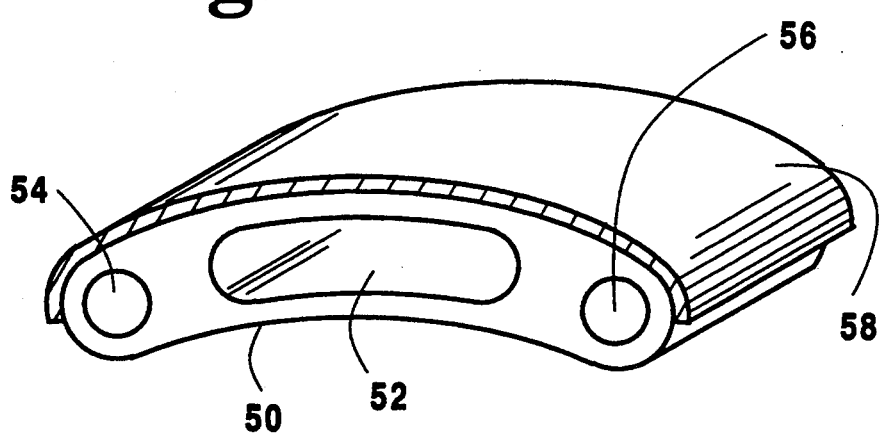

FLUID-COOLED HOLLOW COPPER ELECTRODES AND THEIR USE IN CORONA OR OZONE APPLICATIONS

FIELD OF THE INVENTION

The invention relates to a hollow copper corona electrode that is liquid cooled and a process for using the liquid cooled copper electrode in a corona apparatus or an ozone generator.

BACKGROUND OF THE INVENTION

It is well known that adhesion to the surfaces of materials is improved by the exposure to a corona discharge. Thus corona treatment has been used to treat the surfaces of thermoplastic materials to improve the adhesion of printing inks, paints, coatings and bodies of other materials.

Many methods for the continuous corona discharge surface treatment of thermoplastic materials have been employed wherein the material continuum is passed through an air gap between stationary and roller electrodes. The stationary electrode is typically a bar or cluster of bars and the relatively large roller electrode is coated with a dielectric coatings. A high voltage, of the order of 20 KV at 10 kHz, is typically impressed across the electrodes. A corona arc discharge is developed in the gap and produces surface treatment of the thermoplastic material continuum which results in the promotion of excellent adhesion properties on the surface of the treated continuum. Recently, the stationary electrode has been coated with a dielectric layer rather than the roller electrode.

The watts per inch of the corona discharge system during the continuous treatment of a thermoplastic material continuum results in the temperature of the surface of the electrode containing the dielectric coating to increase to a temperature as high as 150° C. Consequently, at this high temperature, the dielectric layer and the substrate will expand and if their coefficients of thermal expansion is not relatively close then the dielectric layer could crack, bend, distort or spall off. To overcome this problem, the substrate material of the electrode and the material of the dielectric layer are selected so that their coefficients of thermal expansion were relatively close. For example, U.S. Pat. No. 4,841,409 discloses a method of manufacturing a corona discharge electrode at which the core material of the electrode has approximately the same temperature expansion coefficient as the dielectric material employed as the coating.

Cooling means are also used to keep the temperature of the dielectric coated electrode stable and within control. In U.S. Pat. No. 4,145,386 a cylindrical electrode is shown that is cooled by air. In U.S. Pat. No. 4,334,144 a corona apparatus is shown in which the inside of a coated corona electrode is cooled by a fluid. Specifically, in one embodiment the electrode comprises a tubular conductor of copper placed within a glass tube and then a dielectric fluid of oil is fed through the copper tube to cool the electrode. In this embodiment, glass is the dielectric layer of the electrode.

Copper is a good conductor but does not have a coefficient of thermal expansion that is close to a dielectric coated layer such as alumina. Thus when using an elongated alumina coated copper corona electrode in a corona process, the surface of the electrode facing the other electrode of the corona system will rapidly increase in temperature. The difference in temperature at the surface of the electrode facing the other electrode of the corona system will rapidly increase in temperature. The difference in temperature at the front surface of the electrode can become significantly higher than the back surface of the copper electrode which could result in distortion of the electrode. If the distortion is severe, the dielectric layer could crack and spall off. At a minimum, a distortion of the electrode could result in a non-uniform corona discharge along the length of the electrode due to a variation in the spacing between the electrodes that could affect the quality of the corona treatment of the thermoplastic sheet being treated.

It is an object of the present invention to provide a process for the corona surface discharge treatment of thermoplastic materials which uses a hollow elongated dielectric coated copper electrode that is cooled using a fluid such as water.

It is another object of the present invention to provide a hollow elongated dielectric coated copper electrode that is water cooled.

It is another object of the present invention to provide a hollow elongated dielectric coated copper electrode that is fluid cooled and thus enable the electrode to operate at a lower temperature at high power levels and high speed operations without distortion of the electrode.

SUMMARY OF THE INVENTION

The invention relates to a process discharge surface treatment of thermoplastic materials wherein a continuum of the material is passed through an air gap between a stationary electrode and a relatively large roller electrode across which a high voltage is impressed, the improvement which comprises employing as one of the electrodes a hollow elongated copper electrode coated with a dielectric material on at least its surface facing the other electrode and wherein a fluid is fed through the coated copper electrode to cool the copper surface under the dielectric layer during the corona discharge treatment so as to effectively prevent distortion of the electrode that could cause damage to the dielectric coating and/or provide an uneven corona treatment to the material being treated. The fluid that can be used to cool the electrode may be water, deionized water, glycol or any other liquid suitable for cooling the electrode upon contacting the inner wall of the electrode. The electrodes of this invention are ideally suited for operating at a power of 10–50 KV at 5 to 100 KHz.

The invention also relates to a discharge electrode for use in a corona apparatus or in an ozone generator comprising a hollow elongated copper electrode having at least one longitudinal opening through the electrode, a dielectric coating deposited on at least a portion of its surface, and wherein said copper electrode is preferably at least 300 millimeters in length and the thickness of the copper wall under the dielectric layer is at least 0.5 mm thick, preferably at least 1 mm thick and most preferably about 2 mm thick. Copper electrodes shorter than 300 millimeters would generally distort during use, and if distorted, the degree of distortion would not be sufficient to effectively cause problems to the film being treated.

When an elongated corona electrode made of copper and having a dielectric layer on its surface is used in a corona apparatus, the discharge face of the electrode becomes hotter than the back face of the electrode. This difference in temperature between the discharge face and the back face of the electrode could cause the electrode to distort in a generally bow shaped configuration. Although copper is a good base material for the electrode, the difference of the coefficient of thermal expansion between copper and the dielectric layer could result in cracking the dielectric layer. To overcome these drawbacks, the copper electrode is made hollow by having at least one longitudinal channel through the electrode and preferably two longitudinal channels through the electrode. A fluid is then circulated through the corona electrode during use and thereby cools the electrode sufficiently to prevent distortion of the electrode and possible cracking of the dielectric layer. The design of an electrode with two or more longitudinal channels will provide strength and stiffness to the electrode and help prevent distortion of the electrode during the corona discharge operation. The preferred design of a multichannel electrode would be an acruate shape electrode that has three longitudinal channels. The center channel could be used for the incoming fluid and the remaining two channels could be used for returning the fluid.

The outer refractory layer may comprise any one or more of a wide variety of refractory inorganic metal compounds which have dielectric heat resistance properties, such as non-conductive refractory metal oxides, nitride and borides, dielectric ceramics and silica which can be employed to impart high temperature strength, wear resistance, shock resistance and other such properties when applied as protective or shielding coatings. Such dielectric coatings normally possess good high thermal conductivity properties which are desired to prevent the buildup of heat in the electrode and also possess high resistivity, dielectric strength and dielectric constant plus low loss factors. The preferred outer layer would be alumina, silica, calcium oxide, zirconia and dielectric ceramic. The thickness of the outer layer could be from 0.25 to 5.0 millimeters and preferably from 0.5 to 1.2 millimeters thick.

Preferably, a sealant could be used to seal any micropores in the outer coating and thereby fill any voids in the surface of the coating. Suitable sealants would be an epoxy sealant such as UCAR 100 sealant which is obtained from Union Carbide Corporation, Danbury, Conn. UCAR 100 is a trademark of Union Carbide Corporation for a thermosetting epoxy resin. Other suitable sealants are Dow Corning 994 Varnish which is a silicone-based electrical varnish and Xylok 210 which is a phenolaralkyl resin manufactured by Advanced Resin Ltd. of England. Xylok 210 is a trademark of Advanced Resin Ltd. The sealant can effectively seal fine microporosity that may be developed during the coating process and therefore provide a finish with good resistance to contamination that may be encountered during use.

Brief Description of the Drawing

FIG. 3A is a perspective view of another embodiment of a corona electrode for use in this invention.

FIG. 4 is a perspective view of another embodiment of an electrode for use in this invention.

Referring to FIG. 1, a corona apparatus is shown comprising a generator 10 having conductors 12 and 14 for energizing copper electrode 16 and roller electrode 18, respectively, through transformer 19. Copper electrode 16 has a longitudinal opening 20 through which a fluid 21, such as water, is fed from tank 22 using a conventional type pump 24. Copper electrode 16 has a dielectric coating 26 on its entire surface covering faces A and B. Although the dielectric coating 26 is shown applied to the complete surface of copper electrode 16, only the face A of the electrode that faces roller electrode 18 has to be coated. As shown in FIG. 1, roller electrode 18 is grounded. A continuum (film or sheet) of thermoplastic material 28 to be treated is positioned in contact with grounded roller electrode 18. The corona apparatus could operate at a power of from 0.5 kilowatt to 50 kilowatts imparting between 20 and 250 watts per square inch to an electrode.

Figure 1:
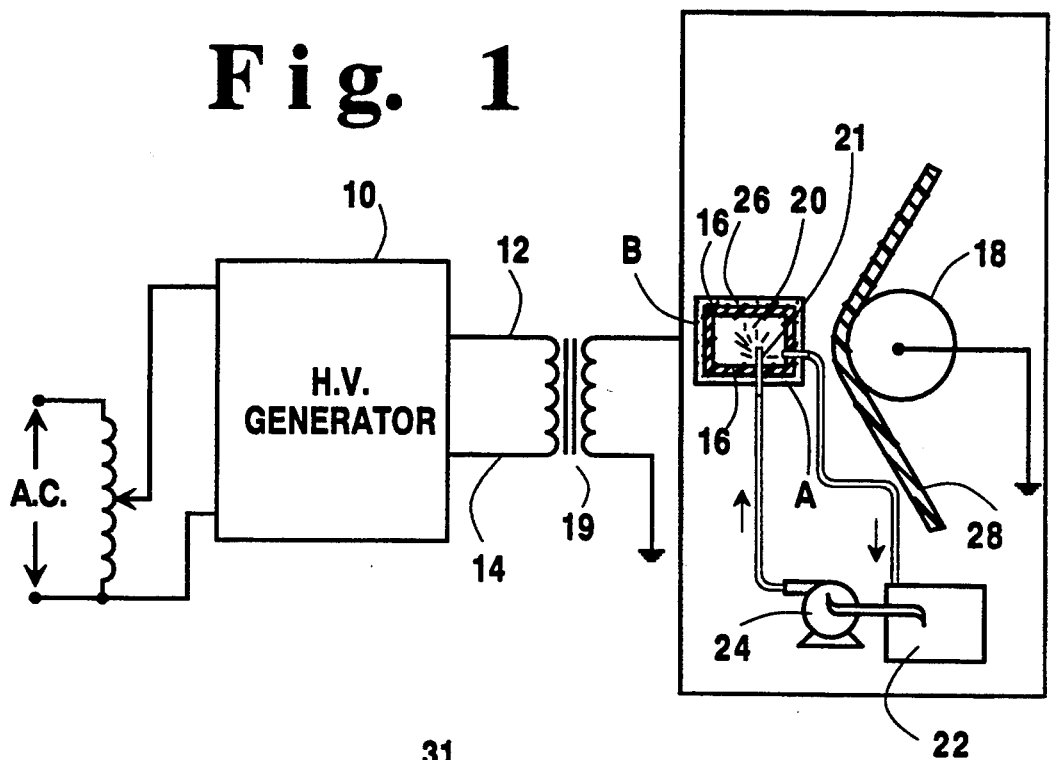
FIG. 1 is a schematic view of corona discharge film treating apparatus suitable for employment in the practice of the process of the invention.

In operation, sheet 28 is fed over the roller electrode 18 while the generator 10 supplies power to energize the electrode at least along the entire length of the electrodes at their mutually facing areas. The material to be treated 28, which may be a sheet or foil of plastics or any other type material, is inserted between the two electrodes 16 and 18 in the areas where the discharge is to occur. Since nearly all of the electric power supplied to the electrodes is converted into heat which is distributed between the surfaces of the electrodes, the temperature of the electrodes increases. The front face A of corona electrode 16 is heated hotter than the back face B which could cause the electrode 16 to distort. To prevent this distortion, a fluid 21, such as a water-based liquid is fed through the electrode preferably on a continuous basis.

Figure 2A:
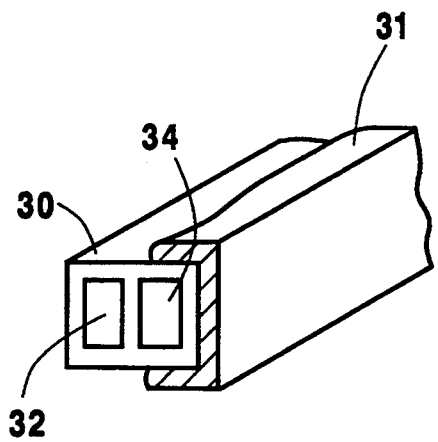
FIG. 2A is a perspective view of one embodiment of an electrode for use in this invention.
Figure 2B:
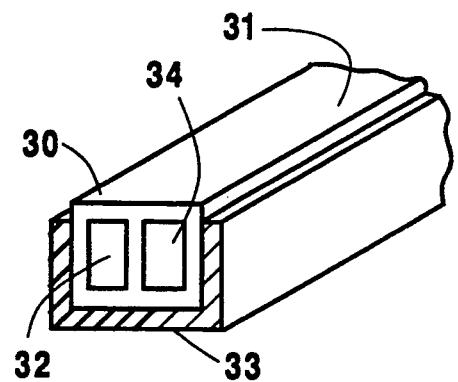
FIG. 2B is a perspective view of the embodiment of FIG. 2A except the coating is deposited on a different surface.

A discharge electrode of this invention could be composed of a hollow elongated electrode having two separately defined hollow channels. FIG. 2A shows such a rectangular electrode composed of a discharge electrode 30 coated with a dielectric material on a portion of its external surface 31 and having a first hollow opening 32 and a second hollow opening 34. In using this embodiment of the invention, a fluid could be fed through one opening 32 and return through parallel opening 34. Preferably, the cooling fluid is a water-based liquid which is fed through the opening that contains the dielectric coating on the exterior of at least one of the walls defining said opening and withdrawn through the other opening. FIG. 2B shows a similar rectangular electrode 30 with hollow openings 34 and 36 and having a dielectric coating 33 on its external surface as shown in which the coating 33 is disposed on surfaces defining the hollow openings 34 and 36.

Figure 3B:
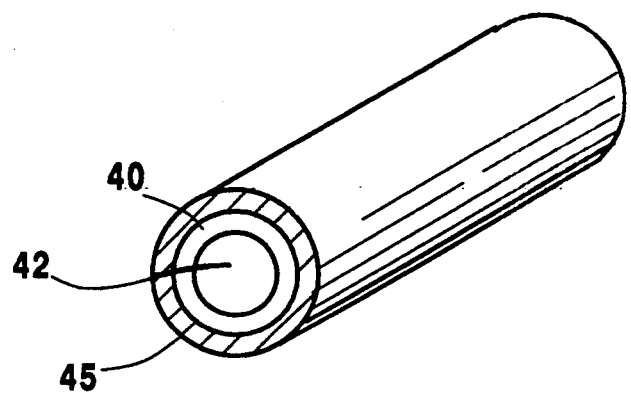
FIG. 3B is a perspective view of the embodiment of FIG. 3A except the coating is deposited on the entire outer surface.

FIG. 3A shows another embodiment of the invention employing a tubular hollow electrode 40 having a centrally defined opening 42. A fluid, such as a water-based liquid, could be fed through electrode 40 to cool the external coating 44 on the electrode for the reasons discussed above. FIG. 3B shows a similar tabular electrode 40 having a centrally defined opening 42 and an external coating 45 deposited on the entire external longitudinal surface of the electrode 40.

FIG. 4 shows another embodiment of the invention employing an arcuate hollow electrode 50 having three spaced apart longitudinal openings 52, 54 and 56. A coolant fluid could be fed through opening 52 and returned through openings 54 and 56. A dielectric coating 58 is deposited on the surface of electrode 50 that will face electrode 18 in FIG. 1.

It will be understood that various changes in the details, materials and arrangements of parts which have been described herein may be made by those skilled in the art within the principle and scope of the invention as expressed in the claims. For example, the cross-section of the corona electrode could comprise any polygonal shape configuration such as a square, a rectangle, a pentagon, or any other shape such as an arcuate shape.

What is claimed:

1. A process discharge surface treatment of thermoplastic materials wherein a continuum of the material passes through an air gap between a stationary electrode and a roller electrode while a high voltage is impressed across said electrodes, the improvement wherein only a portion of the stationary electrode faces the spaced apart roller electrode and the stationary electrode is a hollow elongated copper electrode coated with a dielectric material on at least its surface facing the roller electrode and wherein a fluid is fed through the coated copper electrode to cool the copper surface under the dielectric coating during the corona discharge treatment so as to effectively prevent distortion of the electrode during the corona discharge treatment.

2. The process of claim 1 wherein the dielectric material is selected from the group consisting of alumina, silica, calcium oxide and zirconia.

3. The process of claim 2 wherein the stationary electrode is at least 300 millimeters in length.

4. The process of claim 3 wherein the dielectric material is alumina.

5. The process of claim 1 wherein a sealant material is deposited on top of the dielectric coating.

6. The process of claim 1 wherein the fluid fed through the electrode is deionized water.

7. The process of claim 6 wherein the dielectric material is alumina.

8. A corona discharge apparatus comprising a stationary electrode, a spaced apart roller electrode, and means for inducing a high voltage across said electrodes, said stationary electrode comprising a hollow elongated copper electrode having at least one longitudinal opening through the electrode, a dielectric coating deposited on at least a portion of its surface facing the roller electrode, and wherein said copper electrode is at least 300 millimeters in length and the thickness of the copper wall under the dielectric layer is at least 0.5 mm thick.

9. The stationary electrode of claim 8 wherein the dielectric material is selected from the group consisting of alumina, silica, calcium oxide and zirconia.

10. The stationary electrode of claim 9 wherein the dielectric material is alumina.

11. The stationary electrode of claim 8 wherein the cross-section of the electrode is rectangular.

12. The stationary electrode of claim 8 wherein the cross-section of the electrode is arcuate.

13. The stationary electrode of claim 8 wherein the cross-section of the electrode is circular.

14. The stationary electrode of claim 8 wherein said electrode has at least two parallel longitudinal openings.

15. The stationary electrode of claim 14 wherein the dielectric material is selected from the group consisting of alumina, silica, calcium oxide and zirconia.

16. The stationary electrode of claim 15 wherein the cross-section of the electrode is rectangular or arcuate.

17. The stationary electrode of claim 14 wherein the cross-section of the electrode has an arcuate shape.

* * * * *